United States Patent
Inouye et al.

(10) Patent No.: US 6,501,584 B1
(45) Date of Patent: Dec. 31, 2002

(54) SOUND REDUCED ROTATABLE POLYGON ASSEMBLY

(75) Inventors: Derek Masami Inouye, Lexington, KY (US); Christopher Alan Sanders, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/929,650

(22) Filed: Aug. 14, 2001

(51) Int. Cl.[7] .............................................. G02B 26/08
(52) U.S. Cl. ...................... 359/198; 359/212; 359/216
(58) Field of Search ................... 359/197, 198, 359/212, 216, 217, 218

(56) References Cited

U.S. PATENT DOCUMENTS

| 5,589,973 | A | 12/1996 | King et al. |
| 5,671,081 | A | 9/1997 | Hisa |
| 5,726,699 | A | 3/1998 | Itami et al. |
| 5,901,000 | A | 5/1999 | Fish et al. |
| 6,424,447 | B1 | * 7/2002 | Kaneko et al. .............. 359/216 |

FOREIGN PATENT DOCUMENTS

| JP | 401105907 A | * 4/1989 | ........... G02B/26/10 |
| JP | 407110452 A | * 4/1995 | ........... G02B/26/10 |

* cited by examiner

*Primary Examiner*—Cassandra Spyreu
*Assistant Examiner*—Euncha Cherry
(74) *Attorney, Agent, or Firm*—John A. Brady

(57) ABSTRACT

Mirror (1) of a laser printhead has an octagonal outer configuration. During normal use the mirror rotates at high speed, causing noise. To reduce the a wall (13a) surrounds the mirror and has lower flange extensions (13c', 13c''13c'''13c'''') which firmly contact the lower plate (3) by attaching screws ( 17', 17''). A cover (13) is over all of the circle defined by the wall and the underside of the cover is partially lined with a sound absorbing layer (19).

6 Claims, 3 Drawing Sheets

SOUND REDUCED ROTATABLE POLYGON ASSEMBLY

TECHNICAL FIELD

This invention relates to reducing noise caused by the rotation of an element having an outside surface in the shape of a polygon, such as an octagonal mirror.

BACKGROUND OF THE INVENTION

Rotatable mirrors are commonly used in laser printers. The mirrors are a series of flat mirror surfaces combined to form a regular polygon. Each of the flat surfaces, as it rotates, directs a laser beam reflected form the surface to sweep across a photoconductor. This is widely practiced.

This invention is directed to reducing the noise caused by the air driven by the corners of the polygon. Such noise has a strong pure tone (single frequency component). A previous invention, shown in U.S. Pat. No. 5,901,000, that is assigned to the assignee of this invention, employs a circular wall surrounding the mirror except for an opening permitting the light beam to reach the mirror and be reflected by the mirror to the optical system. That invention employs a depending rib to influence the airflow pattern and thereby reduce noise.

For purposes of this invention the mirror motor system and mounting may be the same as in the foregoing patent 5,901,000. This invention, however, does not employ the rib. Also, in the foregoing patent 5,901,000 the wall was suspended from a top cover. This invention fixes the wall to the bottom support.

DISCLOSURE OF THE INVENTION

In normal operation a polygonal mirror is rotated rapidly around the center of the polygon at one, predetermined velocity. A circular wall surrounding the mirror is fixed to a bottom support plate for the mirror and extends upward from that bottom support plate. The wall has an opening that permits light to reach the polygonal surface of the mirror and to be reflected so as to sweep across a surface such as a photoconductor. The wall has outwardly extending flanges, which contact the support surface except over a limited region in which the support surface is populated with electronic components. More than 200 degrees of the region surrounding the wall does have contact with the support surface. Finally, a major area of a top over the walls contains a sound absorbing material.

BRIEF DESCRIPTION OF THE DRAWINGS

The details of this invention will be described in connection with the accompanying drawings, in which.

DESCRIPTION OF THE PREFERRED EMBODIMENTS

Figure 1:
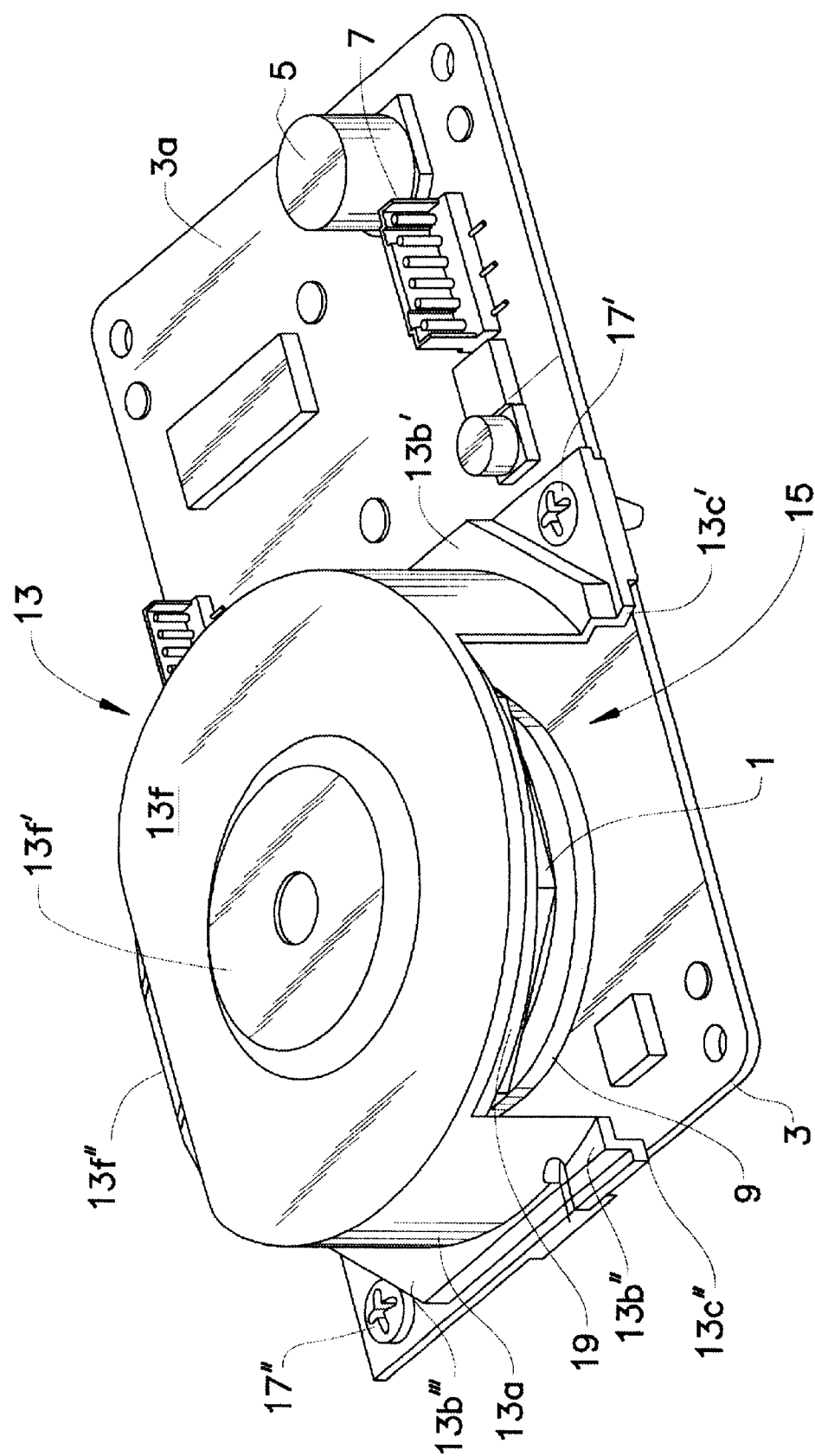
FIG. 1 is a perspective view of the full assembly.

With reference to FIG. 1, a rotatable mirror assembly is shown comprising a mirror 1, the outer surface of which describes a regular octagon. Each of the eight faces of the octagon of mirror I is reflective, as is standard in laser printheads. Mirror 1 is mounted on a support plate 3 for rotation around the center of the regular octagon of mirror 1.

Figure 2:
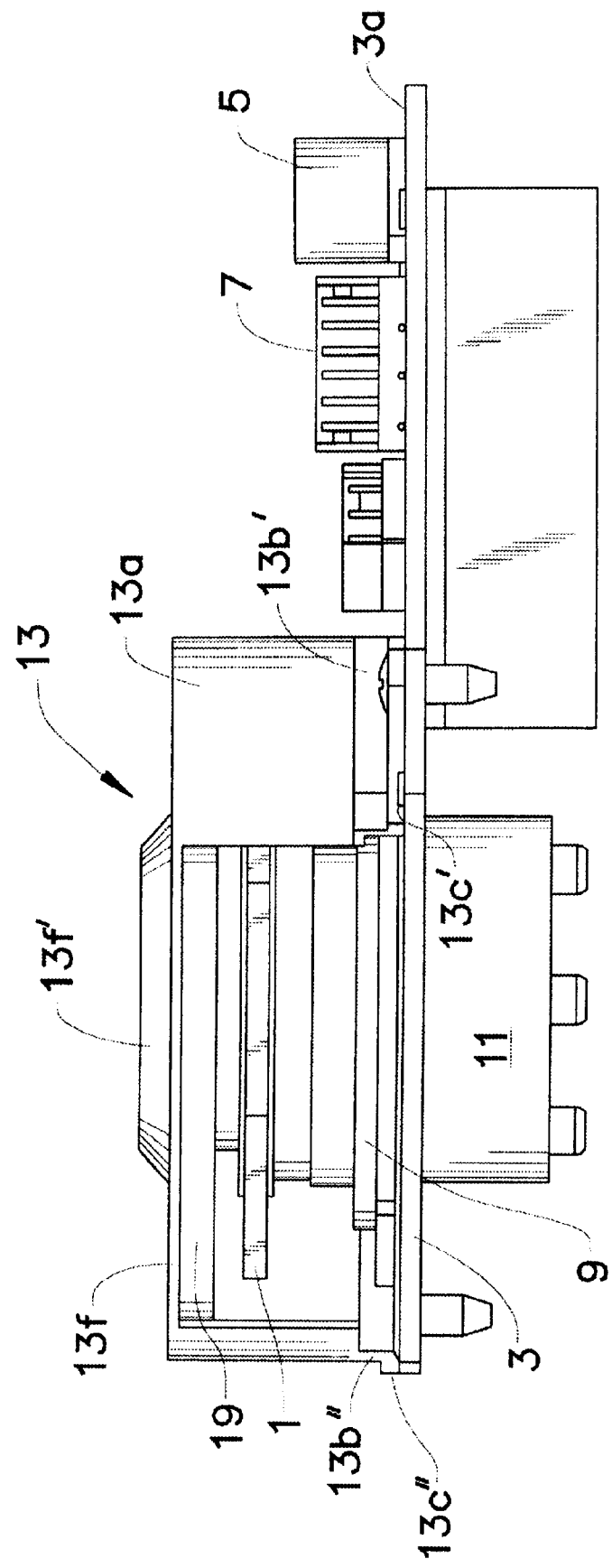
FIG. 2 is a side view of the full assembly.

Support plate 3 is metal with an upper layer 3a of a plastic circuit board attached by adhesive and populated by circuit elements such as capacitor 5 and connector 7. A motor 9, having a bearing 11 (FIG. 2) rotates mirror 1. Circuit elements that control motor 9 generally fill the right half of the upper surface of plate 3 are not all shown as they are not significantly novel or unique with respect to this invention.

Cap 13 of any suitable solid, such as plastic, is supported on plate 3 and encloses mirror 1. Cap 13 has sidewall 13a, that extends downward to near plate 3, where wall 13a exists it is located on a coextensive circle having center point located over the center of mirror 1. Wall 13a does not exist and thereby defines an opening 15 (best seen in FIGS. 1 and 3) that extends for 65 degrees of the circle coextensive with wall 13a.

Figure 3:
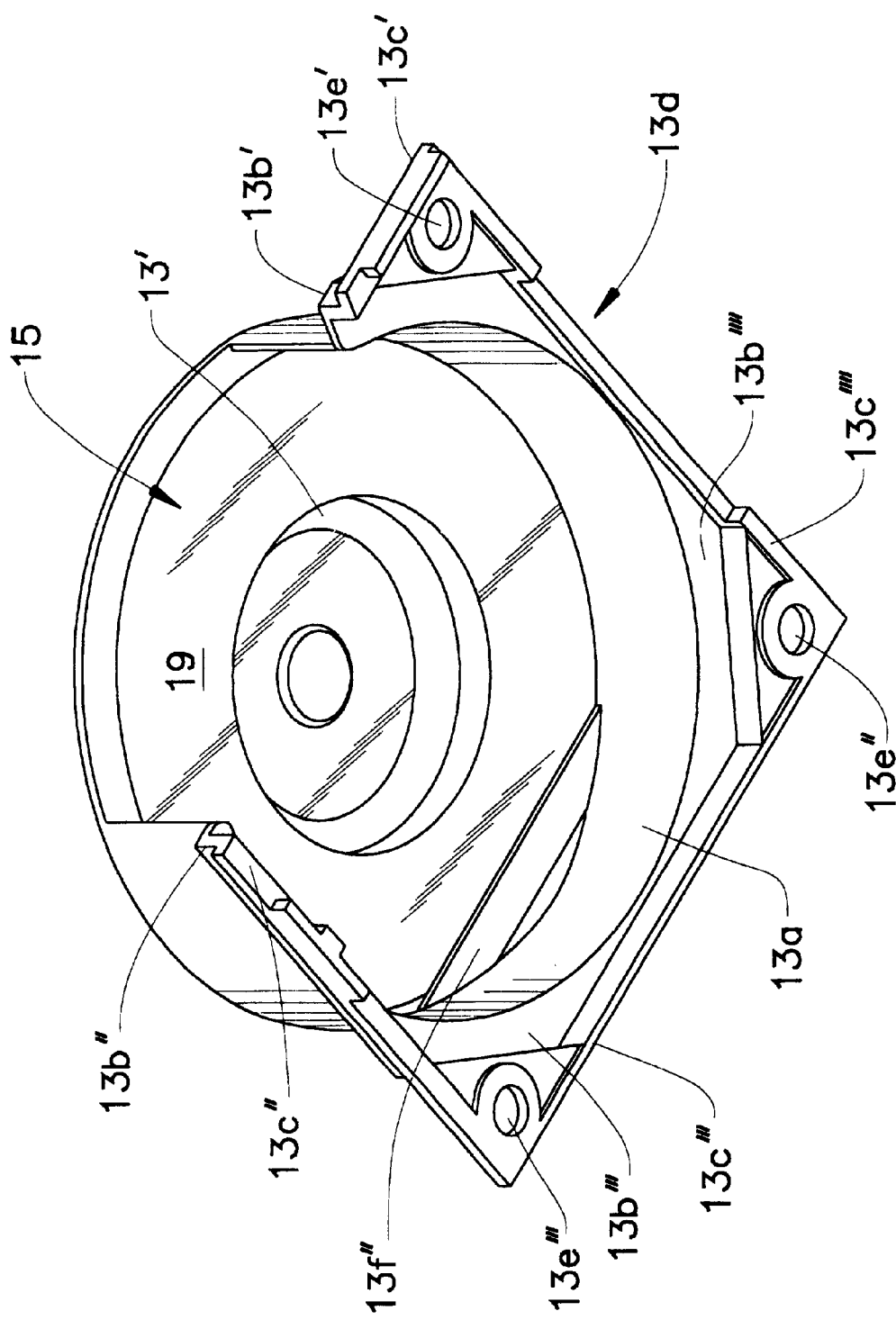
FIG. 3 is a perspective view from the bottom of just the cover.

Bottom part of wall 13a contains outwardly extending flanges 13b', 13b", 13b'" and 13b"" (best seen in FIG. 3). These flanges have outward portions 13c', 13c", 13c'" and 13c"" which contact plate 3. To accommodate circuit elements on board 3a, flanges 13b', 13b"" define a regular notch 13d not reaching the board 3a. Notch 13d extends for about 60 degrees of the circle coextensive with wall 13a. Opening 15 and notch 13d combine so that plate 3 is in contact over a region of 235 degrees of a circle coextensive with wall 13a.

Flanges 13b', 13b"" and 13b'" have holes 13e', 13e" and 13e'" (FIG. 3 only) respectively to receive screws 17' and 17" (FIGS. 1 and 2) (and a third screw [not shown] in hole 13e") to firmly attach cap 13 to plate 3.

Cap 13 has a top cover 13f, which covers entirely the circle coextensive with wall 13a. Cover 13f has a raised portion 13f to accommodate structure supporting mirror 11. Cover 13f has a relatively small section 13f' slanted downward to accommodate a sheet feed path in a particular embodiment.

Attached by acrylic adhesive to the underside of the cover 13f is a layer of sound absorbing foam 19. In a specific embodiment this foam 19 is 3.2 mm thick PORON 4701-50-20125 polyurethane foam, that is a known sound absorbing material. For reasons of commercial convenience, foam layer 19 does not extend to cover raised portion 13f' or slanted portion 13f". The rest of cover 13f is covered by a single foam piece 19. Consequently, slightly more than 50 percent of the bottom of cover 13f is covered by sound absorbing foam 19. This has been sufficient for adequate sound absorbing in an embodiment such as herein disclosed.

This assembly reduces sound power levels typically at least 5 decibels and as much as 8 decibels. In a specific implementation sound power levels are reduced from 71 dBA to 65 dBA.

It will be understood that the dimensions may vary somewhat while still providing an assembly in which sound is reduced. Accordingly, where dimensions are given, dimensions generally similar are applicable, particularly since any final design will normally involve some trial of actual apparatus and modifications based on observations.

What is claimed is:

1. A sound reduced assembly comprising
   a rotatable member having an outer surface describing a regular polygon,
   a support surface on which said rotatable member is mounted on an axis to rotate around generally the center of said polygon,
   a motor which drives said rotatable member around said axis at a rotational velocity during normal operation of said assembly,
   a circular wall surrounding said outer surface of said rotatable member except for an opening of generally 65 degrees of a circle coextensive with said wall, a cover connected to said wall over the top of said wall, said wall and said cover enclosing said rotatable member, said wall being attached to said support surface and having flange portions outwardly extending from the bottom of said wall, said flange portions contacting said support surface over a region coinciding with a least 200 degrees of a circle coextensive with said wall, and a sound absorbing material attached to the bottom of said cover extending entirely around the center of said cover and occupying at least two thirds of the bottom surface of said cover.

2. The assembly as in claim 1 in which said sound absorbing material is a layer of polyurethane foam.

3. The Assembly as in claim 2 in which said layer is in the order of magnitude of 3.2 mm thick.

4. The assembly as in claim 1 in which said sound absorbing material extends over at least about one-half of the area above a circle coextensive with said wall.

5. The assembly as in claim 2 in which said layer of polyurethane extends over at least about one-half of the area above a circle coextensive with said wall.

6. The assembly as in claim 3 in which said layer of polyurethane extends over at least about one-half of the area above a circle coextensive with said wall.

* * * * *

UNITED STATES PATENT AND TRADEMARK OFFICE
CERTIFICATE OF CORRECTION

PATENT NO.   : 6,501,584 B1
DATED        : December 31, 2002
INVENTOR(S)  : Derek Masami Inouye and Christopher Alan Saunders It is certified that error appears in the above-identified patent and that said Letters Patent is hereby corrected as shown below:

<u>Title page,</u>
Item [75], Inventors, the name "Sanders" should read -- Saunders --.

Signed and Sealed this

Tenth Day of June, 2003

JAMES E. ROGAN
*Director of the United States Patent and Trademark Office*